Oct. 14, 1952  F. WHITE  2,613,955
AUXILIARY WHEEL FOR TRACTORS
Filed July 18, 1950

INVENTOR.
FRANCIS WHITE
BY
McMorrow, Berman + Davidson
ATTORNEYS

Patented Oct. 14, 1952

2,613,955

UNITED STATES PATENT OFFICE 2,613,955

AUXILIARY WHEEL FOR TRACTORS

Francis White, Littlefork, Minn.

Application July 18, 1950, Serial No. 174,460

1 Claim. (Cl. 280—150)

This invention relates to tractors, and more particularly to an auxiliary wheel attachment adapted to be employed with a conventional tractor to improve the performance of the tractor particularly in soft, moist, or rough ground.

A main object of the invention is to provide a novel and improved fifth wheel attachment for a tractor, said attachment being very simple in construction, being easy to install, and greatly improving the ability of a tractor to be operated over moist, wet, or rough ground.

A further object of the invention is to provide an improved fifth wheel attachment for use on a tractor, said attachment being very inexpensive to manufacture, being rugged in construction, enabling the tractor on which it is employed to operate over furrows, depressions, and moist ground in a normal manner, preventing mud and loose earth from clogging the front wheels of a tractor and providing more efficient operation generally of the tractor.

Further objects and advantages of the invention will become apparent from the following description and claim, and from the accompanying drawings, wherein:

Figure 1:
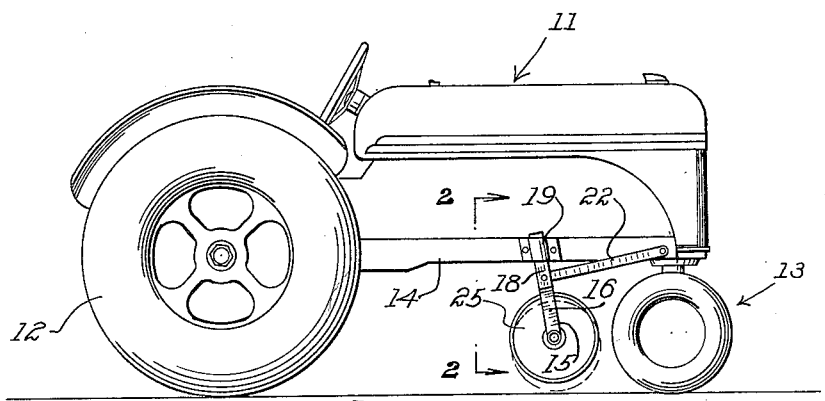
Figure 1 is a side elevational view of a conventional tractor equipped with an improved fifth wheel attachment constructed in accordance with the present invention.
Figure 2:
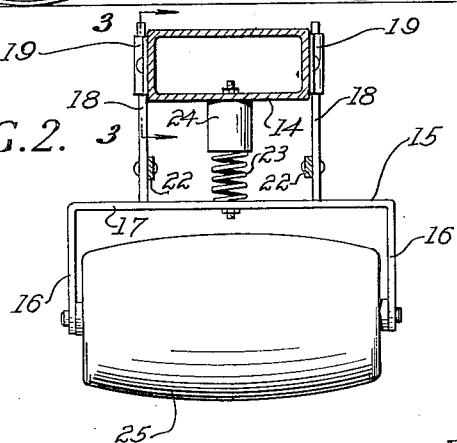
Figure 2 is an enlarged cross sectional detail view taken on line 2—2 of Figure 1.
Figure 3:
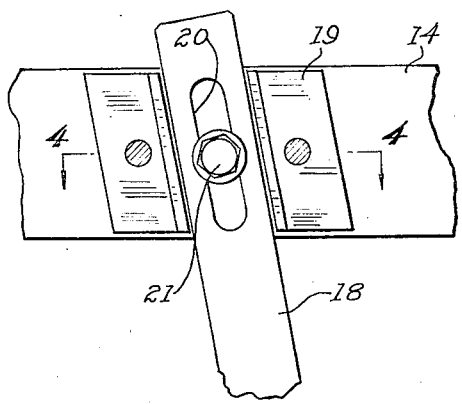
Figure 3 is an enlarged cross sectional detail view taken on line 3—3 of Figure 2.
Figure 4:
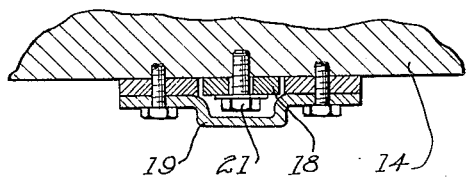
Figure 4 is a cross sectional detail view taken on line 4—4 of Figure 3.

Referring to the drawings, 11 designates a conventional tractor having the rear wheels 12 and the usual front wheels 13. The frame of the tractor is designated at 14. Designated at 15 is a transversely positioned yoke member having the downwardly extending arms 16, 16 and the top bar 17. Rigidly secured on the top bar 17 are the upwardly projecting parallel bar members 18, 18. The upper portions of bar members 18, 18 are slidably received in channel shaped bracket members 19, 19 secured to the side portions of the tractor frame 14 on opposite sides thereof, as shown in Figure 2. As shown in Figures 1 and 3, the channel shaped bracket members are inclined downwardly and forwardly, whereby the bar members 18, 18 are similarly inclined and whereby the plane of the yoke member 15 is similarly inclined downwardly and forwardly. As shown in Figures 3 and 4, the upper portions of the bar members 18 are formed with longitudinal slots 20, and extending through said slots are the bolt members 21 which are threadedly secured in the side portions of the frame 14. The bolt members 21 cooperate with the channel shaped brackets 19 to guide the bar members for sliding movement inside the channel shaped brackets members and to prevent the bar members 18 from being disengaged from the bracket members, during normal operation of the tractor on which the attachment is employed.

The lower portions of the bar members 18, 18 are connected to the forward end portion of the tractor frame by respective link bars 22, 22. The channel shaped bracket members 19, 19 are formed with sufficient clearance for the edges of the bar members 18, 18 to allow said bar members to rotate slightly around the bolts 21, as the yoke member 15 moves vertically during normal operation of the tractor on which the device is mounted. The intermediate portion of the top bar 17 of the yoke 15 is connected to the bottom of the tractor frame 14 by a coil spring 23, the frame 14 having secured thereto a cup member 24 which houses the upper portion of the spring 23 and functions both as a protective cover for the spring and as a stop means for limiting upward movement of yoke member 15 toward the frame 14.

Journaled between the lower ends of the arms 16, 16 of yoke member 15 is a relatively wide convex roller 25 which extends a substantial distance transversely of the tractor, and as shown in Figure 2, is substantially wider than the tractor frame 14. The device is mounted adjacent to the front wheels 13 of the tractor, and as shown in Figure 1 may be located immediately behind the front wheels. Alternatively, the device may be arranged with the roller 25 disposed forwardly adjacent the front wheels 13, assuming that the tractor is of a design permitting such installation. As shown in Figure 1, the roller 25 is normally held by the spring 23 so that its bottom surface is disposed above the ground plane engaged by the bottom of the front wheels 13. The relation of the roller 25 with the front wheels 13, shown in Figure 1, will obtain when the tractor is travelling on hard ground. However, when the tractor is travelling on soft ground, uneven ground, or where the front wheels 13 are running in ruts or depressions, the roller 25 engages the ground adjacent the front wheels and takes a portion of the load of the forward portion of the tractor, the amount of the load taken by said roller depending upon the depth of the depressions in which the front wheels 13 are received. It will therefore be apparent that the tractor will run smoothly over furrows, depressions, moist soil, and uneven ground, and will prevent the front wheels from forming ruts and otherwise excessively indenting the ground over which the tractor passes. The attachment also prevents the tractor from becoming stalled in soft or wet ground and provides a saving in fuel when the tractor is employed over moist, wet or rough ground.

Figure 5:
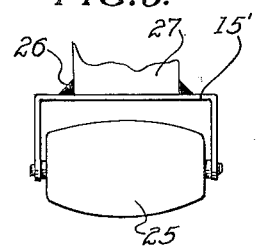
Figure 5 is a fragmentary elevational view showing the fifth wheel and supporting bracket therefor as employed in a modified form of the present invention.

Figure 5 illustrates a modified form of the device according to the present invention comprising a yoke member 15' which is rigidly secured, as by welding 26, to the tractor frame, shown at 27. The yoke 15' may be located at any suitable position on the tractor adjacent the front wheels thereof. As in the previously described embodiment of the present invention, the roller 25 is arranged so that its bottom surface is spaced above the bottom contact plane of the front wheels of the tractor.

While certain specific embodiments of the improved fifth wheel attachment for tractors have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a tractor, a depending yoke member, a pair of upstanding bar elements carried by the respective side portions of said yoke member, respective channeled brackets secured to the sides of the tractor frame and slidably receiving said bar elements, a relatively wide drum-like convex auxiliary wheel journaled between the ends of the depending arms of said yoke member, said auxiliary wheel extending transverse to the tractor adjacent said front wheels, the bottom of said auxiliary wheel being located above the ground engaging surfaces of said front wheels, the portions of said bar elements in said brackets being formed with slots extending parallel to the brackets, and respective bolts extending through said slots and secured to the tractor frame.

FRANCIS WHITE.

REFERENCES CITED

The following references are of record in the file of this patent:

UNITED STATES PATENTS

| Number | Name | Date |
|---|---|---|
| 810,722 | Cook | Jan. 23, 1906 |
| 1,181,094 | McDaniel | Apr. 25, 1916 |
| 2,190,397 | Bugatti | Feb. 13, 1940 |

FOREIGN PATENTS

| Number | Country | Date |
|---|---|---|
| 556,228 | France | Apr. 10, 1923 |
| 573,885 | France | Mar. 20, 1924 |